US010878404B2

(12) United States Patent
Lu et al.

(10) Patent No.: US 10,878,404 B2
(45) Date of Patent: Dec. 29, 2020

(54) METHOD FOR OPERATING AN E-PURSE (75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1176 days.

(21) Appl. No.: 13/519,187

(22) PCT Filed: Jun. 29, 2011

(86) PCT No.: PCT/CN2011/076590
§ 371 (c)(1),
(2), (4) Date: Jun. 26, 2012

(87) PCT Pub. No.: WO2012/000438
PCT Pub. Date: Jan. 5, 2012

(65) Prior Publication Data
US 2012/0296819 A1 Nov. 22, 2012

(30) Foreign Application Priority Data

Jun. 29, 2010 (CN) .......................... 2010 1 0213920
Jun. 29, 2010 (CN) .......................... 2010 1 0214132

(51) Int. Cl.
G06Q 20/34 (2012.01)
G07F 7/08 (2006.01)
G06Q 20/36 (2012.01)

(52) U.S. Cl.
CPC ........... G06Q 20/352 (2013.01); G06Q 20/34 (2013.01); G06Q 20/3672 (2013.01); G07F 7/0866 (2013.01)

(58) Field of Classification Search
None
See application file for complete search history.

(56) References Cited

U.S. PATENT DOCUMENTS

| 5,557,518 | A | * | 9/1996 | Rosen | G06Q 20/02 235/375 |
| 5,596,643 | A | * | 1/1997 | Davis | G06Q 20/02 380/30 |
| 5,635,695 | A | * | 6/1997 | Feiken | G06Q 20/341 235/380 |
| 5,744,787 | A | * | 4/1998 | Teicher | G06Q 20/04 235/375 |
| 6,036,088 | A | * | 3/2000 | Itoh | G06Q 20/341 235/375 |

(Continued)

FOREIGN PATENT DOCUMENTS

| CA | 2380529 A1 * | 2/2001 | ............. G06Q 20/36 |
| WO | WO-0109851 A1 * | 2/2001 | ........... G06Q 20/363 |

*Primary Examiner* — Narayanswamy Subramanian
*Assistant Examiner* — Ayal I. Sharon
(74) *Attorney, Agent, or Firm* — Fay Sharpe LLP (57) ABSTRACT

The invention discloses a method for operating an e-purse, relating to the information security field. The method includes that a CPU card enters into a contactless induction area of a terminal, is powered up and initialized, receives an operation initializing instruction from the terminal, reads and stores data comprising transaction amount in the operation initializing instruction, and performs the related operation. The operation initializing instruction is a complex loading initializing instruction or a purchase initializing instruction. The data comprises transaction amount.

16 Claims, 5 Drawing Sheets

(56) References Cited

U.S. PATENT DOCUMENTS

| | | | | |
|---|---|---|---|---|
| 6,076,075 A * | 6/2000 | Teicher | G06Q 20/10 | 235/375 |
| 6,105,006 A * | 8/2000 | Davis | G06Q 20/10 | 235/379 |
| RE37,067 E * | 2/2001 | Feiken | G06Q 20/341 | 235/380 |
| 6,189,782 B1 * | 2/2001 | Takami | G06Q 20/06 | 235/375 |
| 6,213,392 B1 * | 4/2001 | Zuppicich | G06K 7/0004 | 235/375 |
| 6,330,978 B1 * | 12/2001 | Molano | G06Q 20/349 | 235/380 |
| 6,390,374 B1 * | 5/2002 | Carper | G06K 19/07716 | 235/380 |
| 6,609,114 B1 * | 8/2003 | Gressel | G06Q 20/105 | 705/50 |
| 6,611,819 B1 * | 8/2003 | Oneda | G06Q 20/10 | 705/1.1 |
| 7,020,638 B1 * | 3/2006 | Yacobi | G06Q 20/06 | 380/225 |
| 7,155,411 B1 * | 12/2006 | Blinn | G06Q 20/02 | 705/1.1 |
| 7,269,445 B2 * | 9/2007 | Natsuno | G06F 8/61 | 455/558 |
| 7,523,067 B1 * | 4/2009 | Nakajima | G06Q 20/10 | 705/39 |
| 7,729,986 B1 * | 6/2010 | Hoffman | G06Q 20/04 | 705/41 |
| 7,797,248 B1 * | 9/2010 | Bierbaum | G06Q 20/0652 | 705/1.1 |
| 7,832,634 B1 * | 11/2010 | Bierbaum | G06Q 30/06 | 235/380 |
| 7,882,361 B2 * | 2/2011 | Williams | G06F 21/31 | 713/185 |
| 8,074,232 B2 * | 12/2011 | Lu | G06F 3/038 | 710/260 |
| 8,306,916 B2 * | 11/2012 | Romagnoli | G06Q 20/10 | 705/16 |
| 8,321,345 B2 * | 11/2012 | Makhotin | G06Q 20/10 | 705/39 |
| 8,341,083 B1 * | 12/2012 | Jain | G06K 19/07739 | 705/41 |
| 8,543,500 B2 * | 9/2013 | Ogilvy | G06Q 20/10 | 705/35 |
| 8,548,908 B2 * | 10/2013 | Friedman | G06Q 20/20 | 705/41 |
| 8,719,165 B2 * | 5/2014 | Roy | G06Q 20/32 | 705/41 |
| 8,805,746 B2 * | 8/2014 | Hoffman | G06Q 20/04 | 705/67 |
| 9,311,766 B2 * | 4/2016 | Jain | G06K 7/10237 | |
| 2003/0004891 A1 * | 1/2003 | Van Rensburg | G06F 21/6245 | 705/64 |
| 2003/0026404 A1 * | 2/2003 | Joyce | G06Q 20/00 | 379/144.01 |
| 2004/0006536 A1 * | 1/2004 | Kawashima | G06Q 20/04 | 705/39 |
| 2004/0056082 A1 * | 3/2004 | Kayanakis | G07G 1/14 | 235/379 |
| 2004/0103063 A1 * | 5/2004 | Takayama | G06Q 20/00 | 705/41 |
| 2005/0091116 A1 * | 4/2005 | Monk | G06Q 20/10 | 705/17 |
| 2005/0171904 A1 * | 8/2005 | Yacobi | G06Q 20/02 | 705/40 |
| 2005/0289270 A1 * | 12/2005 | Modave | G06F 21/54 | 710/200 |
| 2006/0095732 A1 * | 5/2006 | Tran | G06F 9/3826 | 712/217 |
| 2006/0161789 A1 * | 7/2006 | Doughty | G06Q 20/327 | 713/186 |
| 2007/0100745 A1 * | 5/2007 | Keiser | G06Q 20/105 | 705/38 |
| 2007/0124534 A1 * | 5/2007 | Iwata | G06F 21/77 | 711/103 |
| 2007/0131761 A1 * | 6/2007 | Smets | G06Q 20/02 | 235/380 |
| 2007/0168260 A1 * | 7/2007 | Cunescu | G06Q 20/00 | 705/26.1 |
| 2007/0219900 A1 * | 9/2007 | MacGuire | G06Q 20/105 | 705/38 |
| 2007/0276874 A1 * | 11/2007 | Hochfield | G07F 7/1008 | |
| 2008/0010470 A1 * | 1/2008 | McKeon | G06F 21/51 | 713/194 |
| 2008/0017703 A1 * | 1/2008 | Lu | G07F 7/1008 | 235/379 |
| 2008/0126398 A1 * | 5/2008 | Cimino | G06Q 20/341 | |
| 2008/0166995 A1 * | 7/2008 | Sun | G06Q 20/085 | 455/406 |
| 2008/0255947 A1 * | 10/2008 | Friedman | G06Q 20/20 | 705/35 |
| 2008/0283617 A1 * | 11/2008 | Lu | G06K 19/0716 | 235/492 |
| 2008/0296371 A1 * | 12/2008 | Lu | G06Q 20/341 | 235/382 |
| 2009/0030842 A1 * | 1/2009 | Hoffman | G07F 7/0866 | 705/66 |
| 2009/0030843 A1 * | 1/2009 | Hoffman | G06Q 20/3674 | 705/67 |
| 2009/0030844 A1 * | 1/2009 | Hoffman | G06Q 20/32 | 705/67 |
| 2009/0063312 A1 * | 3/2009 | Hurst | G06Q 20/105 | 705/30 |
| 2009/0070272 A1 * | 3/2009 | Jain | G06K 19/07739 | 705/75 |
| 2009/0132819 A1 * | 5/2009 | Lu | G06Q 20/10 | 713/169 |
| 2009/0177894 A1 * | 7/2009 | Orsini | G06F 21/6209 | 713/193 |
| 2009/0197641 A1 * | 8/2009 | Rofougaran | G03G 15/6508 | 455/556.1 |
| 2009/0197642 A1 * | 8/2009 | Rofougaran | H04M 1/72527 | 455/556.1 |
| 2009/0198854 A1 * | 8/2009 | Rofougaran | G06F 1/1632 | 710/303 |
| 2009/0198855 A1 * | 8/2009 | Rofougaran | G06F 1/1632 | 710/304 |
| 2009/0198989 A1 * | 8/2009 | Rofougaran | G06F 1/1632 | 713/2 |
| 2009/0199219 A1 * | 8/2009 | Rofougaran | G06F 9/441 | 719/330 |
| 2009/0261162 A1 * | 10/2009 | Kargman | G06Q 20/204 | 235/380 |
| 2009/0271262 A1 * | 10/2009 | Hammad | G06Q 20/04 | 705/14.33 |
| 2009/0288012 A1 * | 11/2009 | Hertel | G06Q 20/02 | 715/738 |
| 2010/0036741 A1 * | 2/2010 | Cleven | G06Q 20/105 | 705/17 |
| 2010/0042517 A1 * | 2/2010 | Paintin | G06Q 30/02 | 705/30 |
| 2010/0063903 A1 * | 3/2010 | Whipple | G06Q 20/40 | 705/30 |
| 2010/0082492 A1 * | 4/2010 | Jarman | G06Q 20/02 | 705/67 |
| 2010/0125510 A1 * | 5/2010 | Smith | G06Q 20/105 | 705/17 |
| 2010/0133337 A1 * | 6/2010 | Van Rensburg | G06Q 20/10 | 235/380 |
| 2010/0217835 A1 * | 8/2010 | Rofougaran | H04M 1/04 | 709/218 |
| 2010/0217836 A1 * | 8/2010 | Rofougaran | H04M 1/04 | 709/218 |
| 2010/0217912 A1 * | 8/2010 | Rofougaran | H04M 1/72527 | 710/304 |
| 2010/0223186 A1 * | 9/2010 | Hogan | G06Q 20/02 | 705/71 |

(56) References Cited

U.S. PATENT DOCUMENTS

| | | | | |
|---|---|---|---|---|
| 2010/0235282 A1* | 9/2010 | Hoffman | G07F 7/0886 | 705/67 |
| 2010/0299255 A1* | 11/2010 | Antoo | G06Q 20/105 | 705/41 |
| 2011/0196788 A1* | 8/2011 | Lu | G06Q 20/105 | 705/41 |
| 2012/0089507 A1* | 4/2012 | Zhang | G06Q 20/10 | 705/39 |
| 2012/0095852 A1* | 4/2012 | Bauer | G06Q 20/105 | 705/16 |
| 2012/0136732 A1* | 5/2012 | McMillen | G06Q 20/105 | 705/16 |
| 2012/0143706 A1* | 6/2012 | Crake | G06Q 20/20 | 705/18 |
| 2012/0259698 A1* | 10/2012 | Yurow | G06Q 20/32 | 705/14.51 |
| 2012/0298747 A1* | 11/2012 | Mestre | G06Q 20/3229 | 235/380 |
| 2012/0310838 A1* | 12/2012 | Harris | G06Q 20/12 | 705/65 |
| 2013/0024372 A1* | 1/2013 | Spodak | G06K 19/06187 | 705/41 |
| 2013/0036048 A1* | 2/2013 | Campos | G06Q 20/36 | 705/41 |
| 2013/0176103 A1* | 7/2013 | Lu | H04L 9/0822 | 340/5.6 |
| 2013/0191279 A1* | 7/2013 | Calman | G06Q 20/3226 | 705/41 |
| 2013/0226791 A1* | 8/2013 | Springer | G06Q 20/353 | 705/41 |
| 2014/0195425 A1* | 7/2014 | Campos | G06Q 20/20 | 705/41 |
| 2014/0324691 A1* | 10/2014 | Thomas | G06Q 20/3572 | 705/41 |

* cited by examiner

METHOD FOR OPERATING AN E-PURSE

FIELD OF THE INVENTION

The invention relates to the information security field, in particular to a method for operating an e-purse in a CPU card.

BACKGROUND OF THE INVENTION

CPU card has a microprocessor which functions as a micro processor, inside of its chip and includes a central processor unit (CPU), a read-only memory (ROM), a random access memory (RAM) and an electrically erasable programmable read-only memory (EEPROM), and thus boasts of high-volume, higher security, off-line job and multi-function development.

The CPU card improves security by applying a powerful and stable security controller, and the internal and external authentication system particular to it and excluded authentication system flagged by Banking IC card specification ensure validity and security of a transaction, and firewall function of the CPU card guarantees security and independence of different applications in one card, and the high-volume storage space of the CPU card meets requirement of storage of more customer information generated by predictable large amount expenditure applications.

In the prior art, e-purse in a CPU card can perform basic transaction functions such as general loading, purchasing, cash withdrawing, and overdraw limit updating. However, for a special application, for example promotion on tier discounts for different loading amounts in those member cards of shopping mall, super market, restaurant, gymnasium and the like, the general loading and purchasing function of the e-purse in prior art is deficient.

SUMMARY OF THE INVENTION

In order to solve the problem in the prior art, the invention provides a method for operating an e-purse.

A method for operating an e-purse, comprising:
entering into a contactless induction area of a terminal, being powered up and initialized by a CPU card, receiving an operation initializing instruction, which is a complex loading initializing instruction or a purchase initializing instruction sent by the terminal, reading and storing data comprising a transaction amount, included in the operation initializing instruction; in case that the operation initializing instruction is a complex-loading initializing instruction, performing a complex-loading initializing operation by the CPU card, receiving an instruction for updating a complex application specific file sent by the terminal, retrieving the complex application specific file, writing predetermined data into the storage space of the complex application specific file to replace what is previously in the storage space, receiving the complex loading instruction sent by the terminal, reading and storing data in the complex loading instruction, computing the transaction amount and data in the complex application specific file according to predetermined algorithm to obtain a new amount and adding the new amount to balance of the e-purse to obtain a new balance; in case that the operation initializing instruction is a purchase initializing instruction, computing the transaction amount and value in related record of the complex application specific file according to predetermined algorithm to obtain a new amount by the CPU card, reading balance of the e-purse, determining whether the new amount is larger than balance of the e-purse plus the overdraft limit of the e-purse, if yes, returning a message of inadequate balance in the e-purse to the terminal and ending the operation by the CPU card; if no, generating a pseudo random umber and a process key, sending a message in response to the purchase initializing instruction to the terminal, receiving a purchase instruction sent by the terminal, reading and storing data in the purchase instruction, deducting the new amount from balance of the e-purse to obtain a newer amount and returning a message in response to the purchase instruction to the terminal.

Advantages:
The invention discloses a method for operating an e-purse, which makes the whole transaction safer, prevents the complex application specific file in a CPU card from being modified invalidly, simplifies the tier discounts by setting the complex application specific file in case of loading, and reduces cost on management.

DETAILED DESCRIPTIONS OF THE EMBODIMENTS

For making purpose, solution and advantage of the invention more explicit, a detailed description will be given of embodiments of the invention in accompany with the drawings.

Embodiment 1

Figure 1:
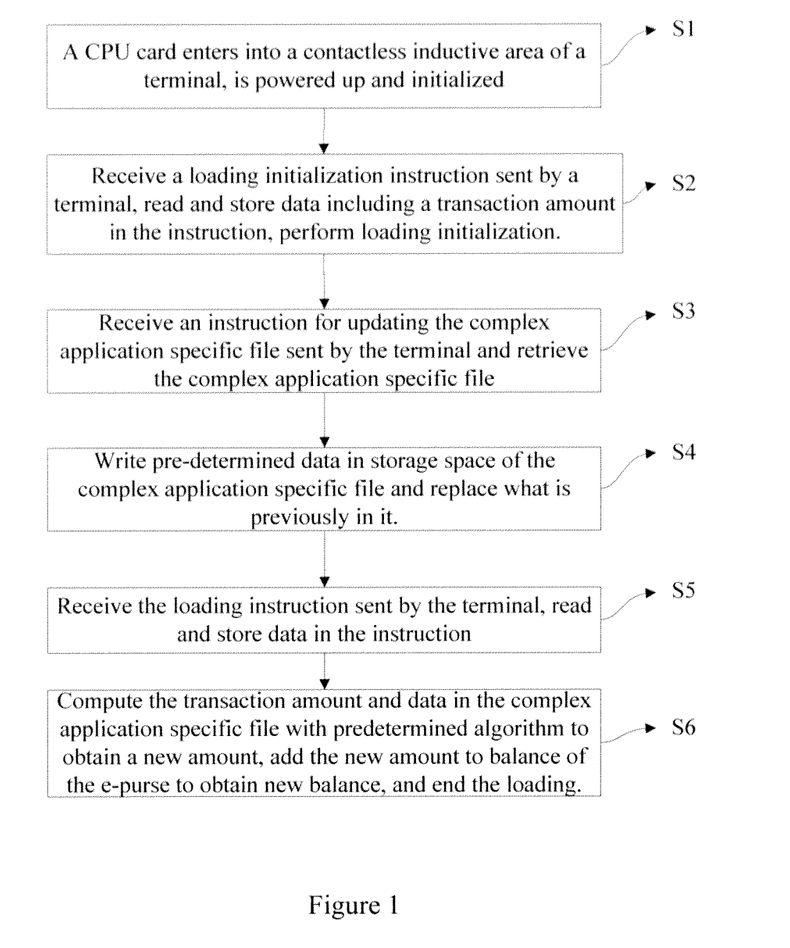
FIG. 1 is a flow chart of a method for complex-loading an e-purse provided in Embodiment 1.

For simplifying the tier discounts preference, a complex application specific file is required to be set in case of complex loading. The embodiment provides a method for complex-loading an e-purse, as shown in FIG. 1, including steps as follows.

Step S1, CPU card enters into a contactless induction area of a terminal, is powered up and initialized.

Step S2, the CPU card receives a complex loading initializing instruction sent by the terminal, reads and stores data including transaction amount, in the complex loading initializing instruction and executes the complex loading initializing operation.

Step S3, the CPU card receives an instruction for updating the complex application specific file sent by the terminal and retrieves the complex application specific file.

Step S4, write predetermined data to the storage space of the complex application specific file and replace what is previously in the storage space.

Step S5, receive the complex loading instruction sent by the terminal, read and store data in the complex loading instruction.

Step S6, compute the transaction amount and data in the complex application specific file with predetermined algorithm to obtain a new amount, add the new amount to balance of the e-purse to obtain a new balance, and end the complex loading.

Embodiments are provided below for detailed description of the method of the invention.

Embodiment 1

The embodiment provides a method for complex-loading an e-purse, for example an e-purse in a CPU card in the embodiment. Besides basic transaction functions of a common e-purse, the e-purse in a CPU card boasts of all transaction functions of a complex application e-purse along with the complex-loading function, and the complex-loading of the e-purse in a CPU card is executed at a CPU terminal. When complex-loading of the e-purse in a CPU card, it computes a transaction amount and a value specially defined in the complex application specific file with predetermined algorithm to obtain a new amount and adds the new amount to balance of the e-purse, and correspondingly the payment is executed with the balance in case of paying.

Figure 2:
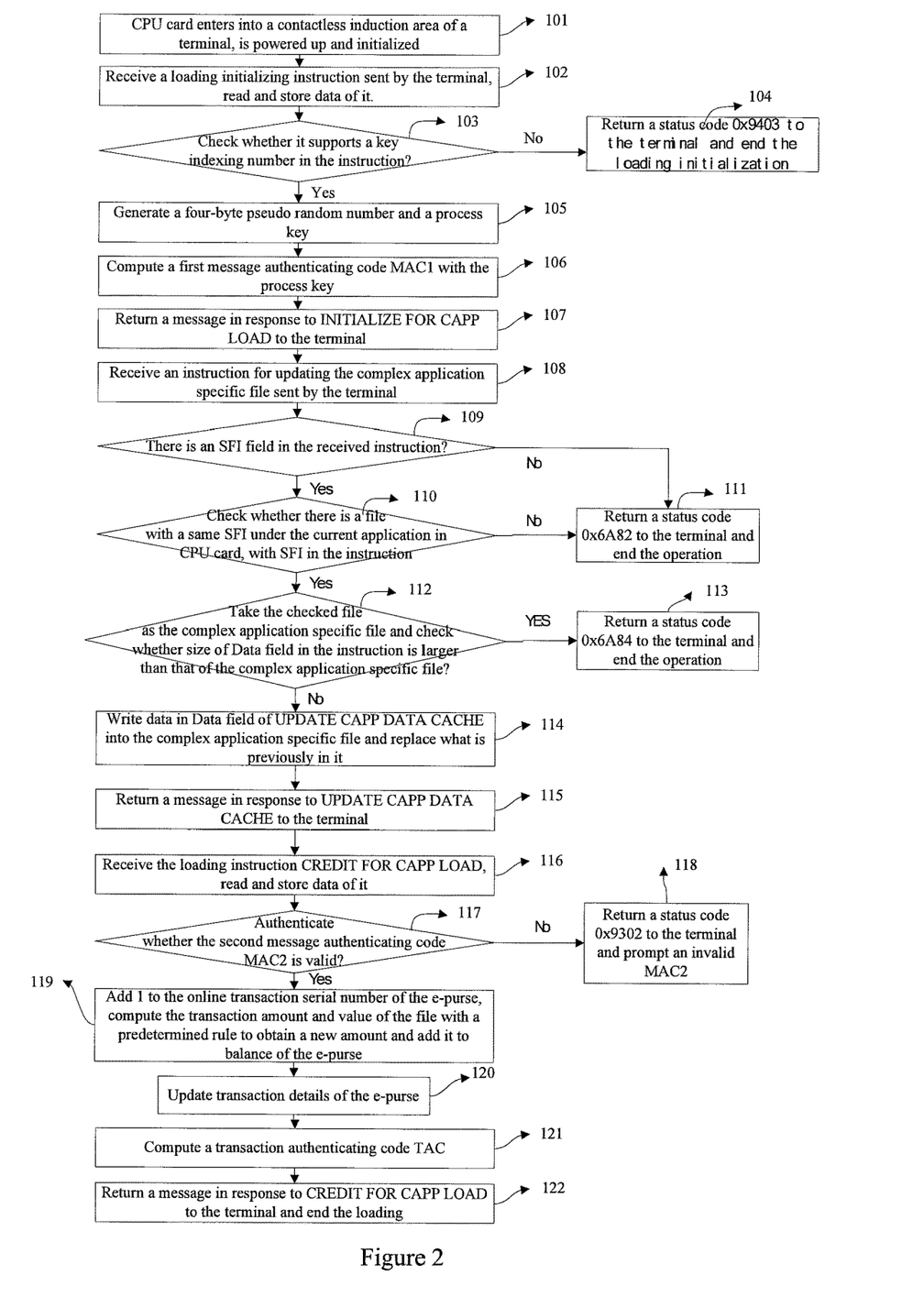
FIG. 2 is a detailed flow chart of a method for complex-loading an e-purse provided in Embodiment 1.

As shown in FIG. 2, a method for complex loading of an e-purse in a CPU card includes steps as follows.

Step 101, a CPU card enters into a contactless induction area of a terminal, is powered up and initialized.

Step 102, receive a complex-loading initializing instruction INITIALIZE FOR CAPP LOAD sent by the terminal, read and store data in the instruction.

In the embodiment, the complex-loading initializing instruction INITIALIZE FOR CAPP LOAD is used for initializing the complex-loading transaction, and message in the instruction INITIALIZE FOR CAPP LOAD is comprised of an instruction header and an instruction body, which are respectively (CLA INS+P1+P2) and (Lc+Data+Le).

CLA+INS+P1+P2 refer to the instruction header and Lc+Data+Le refer to the instruction body. The instruction header includes codes of the instruction, of which CLA refers to type of the instruction, INS to codes of the instruction, P1 and P2 to parameters of the instruction respectively. Of the instruction body, Lc refers to size of the data in Data field, Data to data in the instruction INITIALIZE FOR CAPP LOAD and Le to the maximum number of bytes in APDU data field.

The data in Data field of the instruction INITIALIZE FOR CAPP LOAD includes a key indexing number, a transaction amount and a terminal number in the embodiment.

Specifically, the received instruction INITIALIZE FOR CAPP LOAD in the embodiment is 80 50 06 02 0B 02 00 00 03 E8 00 00 00 00 00 01 10, of which 80 refers to CLA, 50 to INS, 06 to P1 which is defined as a complex-loading initializing flag, 02 to P2 which is defined as an e-purse flag, 0B to Lc, 02 to the key indexing number in Data field, 00 00 03 E8 to the transaction amount in Data field, 00 00 00 00 00 01 to the terminal number in Data field and 10 to Le.

Step 103, check whether the CPU card itself supports the key indexing number included in the instruction INITIALIZE FOR CAPP LOAD, if no, Step 104 is executed; if yes, Step 105 is executed.

Step 104, return a status code 0x9403 to the terminal and end the complex loading initializing operation.

Step 105, generate a four-byte pseudo-random number and a process key.

The generating process key in the embodiment includes steps of linking the pseudo random number, serial number of online transaction of the e-purse and 8000 together, encrypting the linked data with a loading key DLK to obtain encrypted data, that is the process key.

Step 106, compute a first message authenticating code MAC1 with the process key.

The computing a first message authenticating code MAC1 with the process key includes steps of linking the balance, transaction amount, transaction type ID and terminal number of the e-purse together before the transaction, encrypting the linked data with the process key. The first four bytes of the encrypted data are the first message authenticating code MAC1.

Step 107, return a message in response to the instruction INITIALIZE FOR CAPP LOAD to the terminal.

The message in response to the instruction INITIALIZE FOR CAPP LOAD is comprised of Data+sw1+sw2, in case of a successful execution of the instruction INITIALIZE FOR CAPP LOAD, both status codes sw1 and sw2 in the response message are 9000 and data in Data field of the response message includes balance of CPU c-purse before the transaction, serial number of online transaction of the CPU e-purse, version number of the key, algorithm identification (ID), pseudo random number and MAC1;

or in case of a failed execution of the instruction INITIALIZE FOR CAPP LOAD, both status codes sw1 and sw2 in the response message are not 9000 and there is not a DATA field.

Specifically, the message in response to the instruction INITIALIZE FOR CAPP LOAD is 00 00 00 00 00 01 02 03 01 02 03 04 00 01 B10A 90 00.

Step 108, receive an instruction UPDATE CAPP DATA CACHE for updating the complex application specific file sent by the terminal.

The instruction UPDATE CAPP DATA CACHE is used for updating data in the complex application specific file.

The complex application specific file is comprised of a file header and a file body. The file header includes a two-byte FILE_ID, one-byte FILE TYPE, two-byte FILE SIZE, one-byte AC1, one-byte AC2 and two-byte RFU. FILE TYPE 00 indicates a binary file, 01 a fix-sized record file, 02 a changeable-sized record file, 03 a recycle file and 05 a key file. Correspondingly, File Size for a binary file represents size of the file, File Size for a fix-sized record file refers to number and size of records, File Size for a changeable-sized record file to number and maximum size of records, File Size for a recycle file to number and size of records, and File Size for a key file to number and size of records. AC1 refers to a file reading privilege and AC2 to a file writing privilege. What is in the file body is data in the complex application specific file.

Specifically, the complex application specific file is a binary file, and so FILE TYPE is 00, FILE SIZE refers to size of the file which is 000B and content in the file body is empty.

Further, message of the instruction UPDATE CAPP DATA CACHE is comprised of CLA+INS+P1+P2 Lc+Data and in the embodiment, the instruction UPDATE CAPP DATA CACHE is 80 D6 92 B1 04 00 01 20 00, of which 80 refers to CLA, D6 to INS, 92 to P1, B to P2, 04 to Lc and 00 01 20 00 to Data.

Data in Data field of the instruction UPDATE CAPP DATA CACHE is new data to be written to the complex application specific file. Because special application of the complex application specific file may be defined by a card distributor, so be data in Data field. Specifically, in case that the complex application specific file is defined as a rate file, data in Data field is value of the rate, such as 120%.

In case of a defined rate value of 120%, data in the instruction UPDATE CAPP DATA CACHE may be not 120%, but 83.3 or 20%.

Or data in the instruction UPDATE CAPP DATA CACHE may not include a rate value, but generate a rate value with a transaction amount after determination of the transaction amount included in the complex loading initializing instruction by the CPU card, and the generated rate value is written to the complex application specific file.

For example, in case of a transaction amount of RMB800 yuan in the complex loading initializing instruction, less than the predetermined lower limit RMB2000 yuan, a rate value of 90% or 111.1% or 11.1% or RMB100 yuan is generated; in case of a transaction amount of RMB5000 yuan in the complex loading initializing instruction, between the predetermined lower limit RMB2000 yuan and the upper limit RMB6000 yuan, a rate value of 80% or 125% or 25% or RMB600 yuan is generated; in case of a transaction amount of RMB8000 yuan in the complex loading initializing instruction, more than the predetermined lower limit, a value of 75%, or 133%, or 33%, or RMB2000 yuan and etc. is generated.

Step 109, determine whether there is an SFI (short file identifier) field in the received instruction UPDATE CAPP DATA CACHE, if yes, Step 110 is executed; if no, Step 111 is executed.

The determining whether there is an SFI field in the instruction UPDATE CAPP DATA CACHE includes steps of determining whether the higher three bits of the instruction UPDATE CAPP DATA CACHE are 100, if yes, there is an SFI field and the lower five bits refer to value of the SFI field; or if no, there is not an SFI field.

Specifically, P1 of the instruction UPDATE CAPP DATA CACHE is 92, which indicates that the higher three bits of P1 are 100 and there is an SFI field.

Step 110, retrieve whether there is a file under the current application of the CPU card with a same SFI as the SFI in the instruction UPDATE CAPP DATA CACHE, if no, Step 111 is executed; if yes, Step 112 is executed.

Step 111, return a status code 0x6A82 to the terminal and end the operation.

Step 112, take the file retrieved at Step 110 as the complex application specific file and check whether size of Data field in the instruction UPDATE CAPP DATA CACHE is larger than size of the complex application specific file, if yes, Step 113 is executed; or if no, Step 114 is executed.

Because the complex application specific file is a binary file, size of it is value of FILE SIZE. Step 112 specifically is determining whether value of Lc field in the instruction UPDATE CAPP DATA CACHE is bigger than the value of FILE SIZE in the complex application specific file. The value of Lc field in the instruction UPDATE CAPP DATA CACHE is 04 and value of FILE SIZE is 000B, and therefore size of Data field in the instruction UPDATE CAPP DATA CACHE is not larger than that of the complex application specific file.

Step 113, return a status code 0x6A84 to the terminal and end the operation.

Step 114, write data in Data field of the instruction UPDATE CAPP DATA CACHE to the complex application specific file and replace what is previously in it.

It includes steps of writing a rate value of 120% to the complex application specific file and replacing what is previously in it.

Because the complex application specific file is an empty file, the step is writing 00 01 20 00 in Data field of the instruction UPDATE CAPP DATA CACHE to the complex application specific file.

In case of a rate value of 83% in the instruction UPDATE CAPP DATA CACHE, the step is writing 83.3% to the complex application specific file; or in case of a rate value of 20% in the instruction UPDATE CAPP DATA CACHE, the step is writing 20% into the complex application specific file.

Or data in the instruction UPDATE CAPP DATA CACHE may not include a rate value, but generate a rate value with a transaction amount according to predetermined algorithm after determination of the transaction amount included in the complex loading initializing instruction by the CPU card, and then the generated rate value is written to the complex application specific file after determining whether size of the generated value is larger than size of the complex application specific file or not. For example, in case of a transaction amount of RMB800 yuan in the complex-loading initializing instruction, less than the predetermined lower limit RMB2000 yuan, a rate value of 90% or 111.1% or RMB100 yuan is generated and written to the complex application specific file; in case of a transaction amount of RMB5000 yuan in the complex-loading initializing instruction, between the predetermined lower limit RMB2000 yuan and the upper limit RMB6000 yuan, a rate value of 80% or 125% or 25% or RMB600 yuan is generated and written to the complex application specific file; in case of a transaction amount of RMB8000 yuan in the complex-loading initializing instruction, bigger than the predetermined upper limit RMB6000 yuan, a rate value of 75% or 133% or 33% or RMB2000 yuan is generated and written to the complex application specific file.

Step 115, return a message in response to the instruction UPDATE CAPP DATA CACHE to the terminal.

The message in response to the instruction UPDATE CAPP DATA CACHE is comprised of sw1+sw2 and there is not a DATA field. In case of a successful execution of the instruction, the response message is 9000 while in case of a failed execution of the instruction, the response message is not 9000.

Step 116, receive the complex-loading instruction CREDIT FOR CAPP LOAD sent by the terminal, read and store data in Data field of the instruction.

The complex-loading instruction CREDIT FOR CAPP LOAD is used for complex loading the transaction, and message of the instruction CREDIT FOR CAPP LOAD is comprised of CLA+INS+P1+P2+Lc+Data+Le, of which data in Data field includes transaction date, transaction time and a second message authenticating code MAC2.

The received instruction CREDIT FOR CAPP LOAD is 80 52 00 00 0B 07 DA 06 08 0A 14 2D 00 01 A1 0B 08, of which 80 refers to CLA, 52 to INS, 00 to Pt, 00 to P2, 0B to Lc, 07 DA 06 08 to transaction date in Data field, 0A 14 2D to the transaction time in Data field, 00 01 A1 0B to MAC2 in Data field and 08 to Le.

Step 117, authenticate whether the second message authenticating code MAC2 is valid, if no, Step 118 is executed; or if yes, Step 119 is executed.

The authenticating whether MAC2 is valid includes steps of linking the transaction amount, transaction type id, terminal number, transaction date and time together, encrypting the linked data with the process key generated at step 105, and comparing the first four bytes of the encrypted data to MAC2 in Data field of the instruction CREDIT FOR CAPP LOAD, if a match is not found, MAC2 is invalid; or if a match is found, MAC2 is valid.

Step 118, return a status code 0x9302 to the terminal and prompt an invalid MAC2.

Step 119, add 1 to the serial number of online transaction of the e-purse, compute the transaction amount and value in the complex application specific file with a predetermined algorithm to obtain a new amount and add the new amount to balance of the e-purse.

The predetermined algorithm includes multiplex, division, addition, subtraction and various combinations of the four algorithms.

Further, value in the complex application specific file refers to a rate value, for example 120%, and in case of a transaction amount of RMB1000 yuan and a balance of RMB0 yuan in the e-purse, a new amount RMB1200 yuan is obtained by multiplexing the transaction amount RMB1000 yuan by the rate value of 120% recorded in the complex application specific file, and then a new balance RMB1200 yuan is obtained by adding the new amount RMB1200 yuan to the balance RMB0 yuan of the e-purse, and so the new balance RMB1200 yuan of the e-purse is bigger than the transaction amount RMB1000 yuan plus the balance RMB0 yuan of the e-purse.

In case of a rate value of 83.3% being written in the complex application specific file, if the transaction amount is RMB1000 yuan and balance of the e-purse is RMB0 yuan, a new amount RMB1200 yuan is obtained by dividing the transaction amount RMB1000 yuan by the rate value of 83.3%, and a new balance RMB1200 is obtained by adding the new amount RMB1200 yuan to the balance RMB0 yuan of the e-purse and the new balance RMB yuan of the e-purse is bigger than the transaction amount RMB1000 yuan plus the balance RMB0 yuan of the e-purse.

In case of a rate value of 20% being written in the complex application specific file, if the transaction amount is RMB1000 yuan and balance in the e-purse is RMB0 yuan, a new amount RMB1200 yuan is computed by transaction amount RMB1000 yuan* rate value of 20%+transaction amount RMB1000 yuan, and a new balance RMB1200 yuan is obtained by adding the new amount RMB1200 yuan to the balance RMB0 yuan of the e-purse and the new balance RMB1200 yuan of the e-purse is bigger than the transaction amount RMB1000 yuan plus the balance RMB0 yuan of the e-purse.

Or in case of a transaction amount RMB8000 yuan in the complex-loading initializing instruction, a rate value 75% or 133% or 33% or RMB2000 yuan is generated and written to the complex application specific file. For example, in case of a rate value of 75%, a new amount RMB10060 yuan is computed by dividing the transaction amount RMB8000 yuan by 75%, and a new balance RMB10060 yuan is computed by adding the new amount RMB10060 yuan to the balance RMB0 yuan of the e-purse and the new balance is bigger than the transaction amount RMB8000 yuan plus the balance RMB0 yuan of the e-purse. For another example, in case of a written rate value of 133%, a new amount RMB10060 yuan is computed by multiplexing the transaction amount RMB8000 yuan by the rate value of 133%, and a new balance of RMB10060 yuan is computed by adding the new amount RMB10060 yuan to the balance RMB0 yuan of the e-purse and the new balance is bigger than the transaction amount RMB8000 yuan plus the balance RMB0 yuan of the e-purse. For further example, in case of a written rate value of 33%, a new amount of RMB10060 yuan is obtained by the transaction amount RMB8000 yuan *the rate value 33%+the transaction amount of RMB8000 yuan, and a new balance of RMB10060 yuan of the e-purse is computed by adding the new amount RMB10060 yuan to the balance RMB0 yuan of the e-purse and the new balance is bigger than the transaction amount RMB8000 yuan plus the balance RMB0 yuan of the e-purse. For further example, in case of a written rate value of RMB2000 yuan, a new amount of RMB10000 yuan is computed by adding the transaction amount RMB8000 yuan to the rate value RMB2000 yuan, and a new balance RMB10000 yuan is computed by the new amount RMB10000 yuan plus the balance RMB0 yuan, and the new balance is larger than the transaction amount RMB8000 yuan plus the balance RMB0 yuan of the e-purse.

Step 120, update transaction details of the e-purse.

Specifically the step is linking serial number of online transaction of the e-purse, transaction amount, transaction type id, terminal number, transaction date and time together to form a record for updating the standard transaction details.

Step 121, compute a transaction authenticating code TAC.

The step includes sub-steps of performing XOR operation on the left and right 8 bytes of DTK, linking the after-transaction balance of e-purse, serial number of online transaction of the e-purse before adding 1, transaction amount, transaction type id, terminal number, transaction date and time together, and encrypting the linked data with the result from the XOR operation to obtain an encrypted data TAC.

Step 122, return a message in response to the instruction CREDIT FOR CAPP LOAD to the terminal and end the complex loading operation.

The message in response to the instruction CREDIT FOR CAPP LOAD is comprised of data+sw1+sw2, and in case of a successful execution of the instruction CREDIT FOR CAPP LOAD, both the status codes sw1 and sw2 in the message in response to the instruction CREDIT FOR CAPP LOAD are 9000 and data in DATA field is TAC, or in case of a failed execution of the instruction CREDIT FOR CAPP LOAD, the status codes sw1 and sw2 in the message in response to the instruction CREDIT FOR CAPP LOAD are not 9000 and there is not a DATA field.

The message in response to the instruction CREDIT FOR CAPP LOAD is 00 05 D2 BC 90 00 in the embodiment.

In case that the complex application specific file is a record file, each record in the complex application specific file relates to an application. Specifically, File Type 01 flags the complex application specific file as a fix-sized record file, and File Size for the fix-sized record file are number and size of records.

Steps 108-116 for updating the complex application specific file may be replaced with steps as follows.

Step 108', receive a record updating instruction UPDATE RECORD sent by the terminal.

The record updating instruction UPDATE RECORD is used for updating a record designated in the instruction and is applicable for both fix-sized and changeable-sized record file.

The message of the instruction UPDATE RECORD is comprised of CLA INS+P1+P2+Lc+Data, of which P1 and P2 are used for selecting a file and designating a record therefrom as record for the complex application specific file and Lc is size of Data field plus 4 bytes. Specifically the instruction UPDATE RECORD is comprised of 00 DC 03 04 08 00 01 20 00, of which 00 refers to CLA, DC to INS, 03 to P1, 04 to P2, 08 to Lc and 00 01 20 00 to Data.

What is in Data field of the instruction UPDATE RECORD is new data to be written to the complex application specific file, and special application of the complex application specific file may be defined by a card distributor, so be data in Data field. For example, the complex application specific file may be defined as a rate value file and thus data in Data field refers to a rate value, such as 120%.

Step 109', determine whether there is an SFI field in the record updating instruction UPDATE RECORD, if yes, Step 110' is executed; or if no, Step 111' is executed.

The determining whether there is an SFI field in the record updating instruction UPDATE RECORD specifically includes determining whether all higher five bits of P2 in the instruction UPDATE RECORD are 0, if yes, there is an SFI field and the high five bits of P2 are value in SFI field; or if no, there is not an SFI field.

Step 110', retrieve whether there is a file under the current application of the CPU card, with a same SFI as that SFI in the instruction UPDATE RECORD, if no, Step 111' is executed; or if no, Step 112' is executed.

Step 111' return a status code 0x6A82 to the terminal and end the complex-loading operation.

Step 112', take the file retrieved at Step 110' as the complex application specific file and retrieve the record from the complex application specific file according to a designated record number in the instruction UPDATE RECORD, if no retrieved, Step 113' is executed; or if retrieved, Step 114' is executed.

Step 113', return a status code 0x6A83 to the terminal and end the complex-loading operation.

Step 114', check whether size of Data field in the instruction UPDATE RECORD is larger than size of the record retrieved at Step 112', if yes, Step 115' is executed; or if no, Step 116' is executed.

Step 115', return a status code 0x6A84 to the terminal and end the complex-loading operation.

Step 116', write data in Data field of the instruction UPDATE RECORD to the retrieved record and replace what is previously in the record.

The step is writing a rate value of 120% into the record, and replacing what is previously in the record.

Step 117', return a message in response to the instruction UPDATE RECORD to the terminal.

The message in response to the instruction UPDATE RECORD is comprised of sw1+sw2 and there is not a Data field. The message is 9000 in case of a successful execution of the instruction UPDATE RECORD, or not 9000 in case of a failed execution of the instruction UPDATE RECORD.

Figure 3:
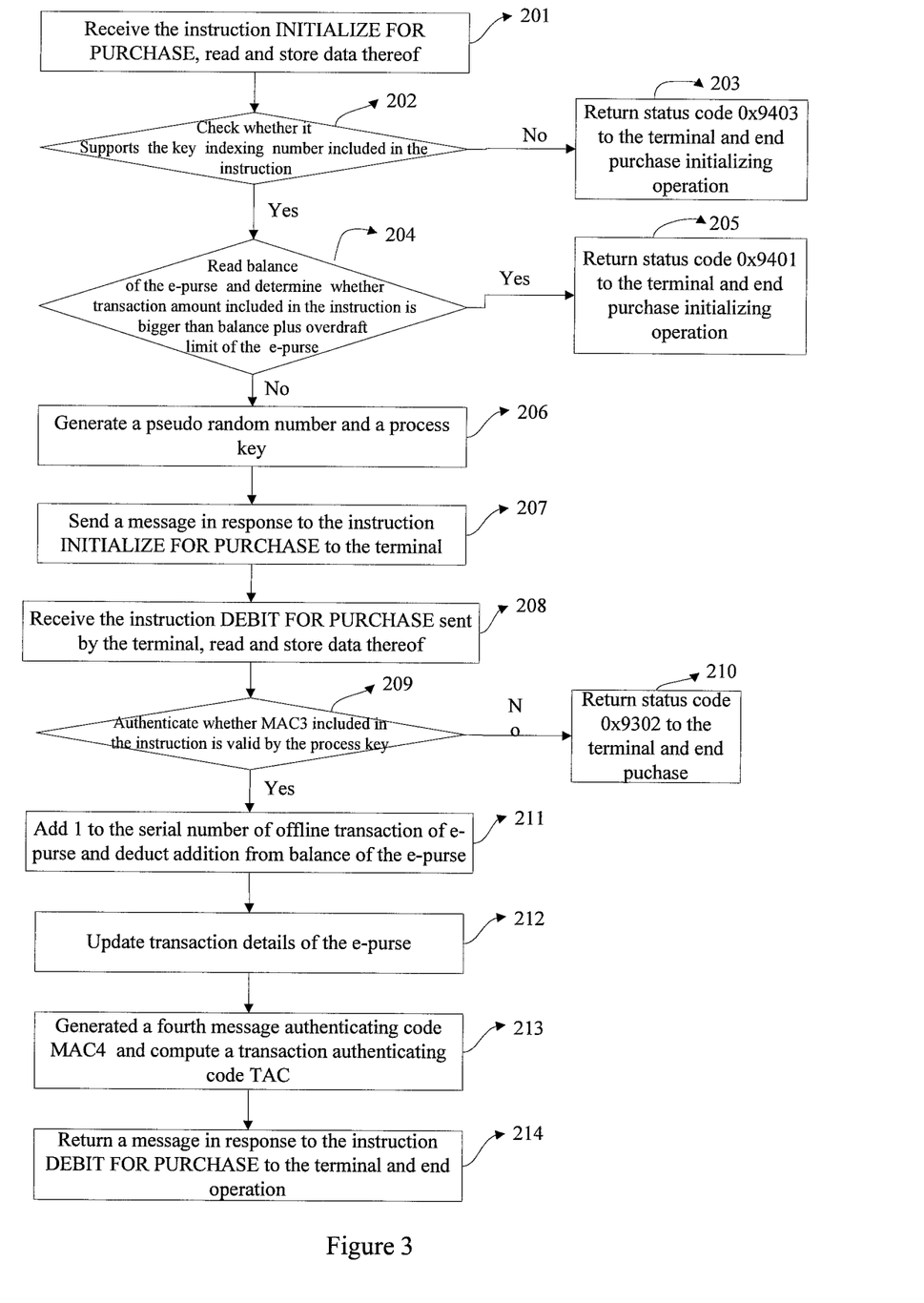
FIG. 3 is a detailed flow chart of a method for purchase with an e-purse provided in Embodiment 1.

After the complex-loading operation by the above method, the e-purse in the CPU card can be used to purchase, as shown in FIG. 3, including purchase steps as follows.

Step 201, receive a purchase initializing instruction INITIALIZE FOR. PURCHASE sent by the terminal, read and store data in the instruction.

The purchase initializing instruction INITIALIZE FOR PURCHASE is used for initializing a purchase.

The message of the instruction INITIALIZE FOR PURCHASE is comprised of an instruction header and an instruction body, for example (CLA+INS+P1+P2)+(Lc+Data+Le).

CLA+INS+P1+P2 is instruction header and Lc+Data+Le is instruction body.

The instruction header refers to codes of the instruction, of which CLA represents type of the instruction, INS are codes of the instruction, P1 and P2 are parameters of the instruction. Of the instruction body, Lc refers to size of data in Data field, Data to data of the instruction INITIALIZE FOR PURCHASE and Le to maximum number of bytes in Data field of the expected answer APDU.

Data in the instruction INITIALIZE FOR PURCHASE includes a key indexing number, a transaction amount and a terminal number.

The received instruction INITIALIZE FOR PURCHASE is 80 50 01 02 0B 02 00 00 00 C8 00 00 00 00 00 01 0F, of which 80 refers to CLA, 50 to INS, 01 to P1, 02 to P2 which is defined as an e-purse flag, 0B to Lc, 02 to the key indexing number in Data field, 00 00 00 C8 to the transaction amount in Data field, 00 00 00 00 00 01 to the terminal number in Data field and 0F to Le.

Step 202, check whether the CPU card supports the key indexing number included in the instruction INITIALIZE FOR PURCHASE, if no, Step 203 is executed; or if yes, Step 204 is executed.

Step 203, return a status code 0x9403 to the terminal and end the purchase initializing operation.

Step 204, read balance of the e-purse and determine whether the transaction amount included in the instruction INITIALIZE FOR PURCHASE is bigger than the balance plus overdraft limit of the e-purse, if yes, Step 205 is executed; or if no, Step 206 is executed.

Step 205, return a status code 0x9401 to the terminal and end the purchase initializing operation.

Step 206, generate a pseudo random number and a process key.

The process key is used for purchase with a CPU e-purse or an M1 e-purse, which is obtained by permission of DPK.

Step 207, send a message in response to the instruction INITIALIZE FOR PURCHASE to the terminal.

The message in response to the instruction INITIALIZE FOR PURCHASE is comprised of Data+sw1+sw2. In case of a successful execution of the instruction, both the status codes sw1 and sw2 in the response message are 9000 and data in Data field of the response message includes balance of the e-purse, serial number of offline transaction of the CPU e-purse, overdraft limit of the CPU e-purse, version number of the key, algorithm id and pseudo random number; or in case of a failed execution, there are only the status codes sw1 and sw2 in the response message and values thereof are not 9000.

The message in response to the instruction INITIALIZE FOR PURCHASE, being returned to the terminal, is 00 00 4B 00 00 01 00 00 64 02 03 01 02 03 04 90 00.

Step 208, receive a purchase instruction DEBIT FOR PURCHASE sent by the terminal, read and store data thereof.

The instruction DEBIT FOR PURCHASE is used for purchase.

The message of the instruction DEBIT FOR PURCHASE is also comprised of CLA+INS+P1+P2+Lc+Data+Le and data in the instruction DEBIT FOR PURCHASE includes a terminal transaction serial number, transaction date, transaction time and a third message authenticating code MAC3.

The received instruction DEBIT FOR PURCHASE is 80 54 01 00 0F 00 00 00 01 7D A0 06 09 0F 27 13 01 0A D1 0C 08, of which 80 refers to CLA, 54 to INS, 01 to P1, 00 to P2, 0F to Lc, 00 00 00 01 to the terminal transaction serial number in Data field, 7D A0 06 09 to the transaction date in Data field, 0F 27 13 to transaction time in Data field, 01 0A D1 0C to MAC3 in Data field and 08 to Le.

Step 209, authenticate whether MAC3 included in the instruction DEBIT FOR PURCHASE is valid by the process key generated at Step 205, if no, Step 210 is executed; or if yes, Step 211 is executed.

The authenticating whether MAC3 included in the instruction DEBIT FOR PURCHASE is valid includes steps of linking the transaction amount, transaction type id, terminal number, transaction date and time of the terminal together, encrypting the linked data with a process key generated at Step 206, and comparing the first four bytes of the encrypted data to MAC3 included in the instruction DEBIT FOR PURCHASE, if a match is found, MAC3 is valid; or if no, MAC3 is invalid.

Step 210, return a status code 0x9302 to the terminal and end the operation.

Step 211, add 1 to serial number of offline transaction of the e-purse and deduct the addition from balance of the e-purse.

In case of a transaction amount of RMB200 yuan and a balance of RMB1200 yuan in the e-purse, a new balance of RMB1000 yuan is computed by deducting RMB200 yuan from the original balance RMB1200 yuan of the e-purse.

Step 212, update transaction details of the e-purse.

The transaction details of the e-purse, to be updated includes a transaction amount, a transaction type id, a terminal number, transaction date and time. The CPU card links the transaction amount, transaction type id, terminal number, transaction date and time together to form a record for updating.

Step 213, generate a fourth message authenticating code MAC4 and compute a transaction authenticating code TAC.

The generating a fourth message authenticating code MAC4 includes steps of encrypting the transaction amount with the process key generated at Step 206 and taking the first four bytes of the encrypted data as the fourth message authenticating code MAC4.

Computing TAC with the XOR operation result includes steps of performing an XOR operation on the left and right 8 bytes of DTK, linking the transaction amount, transaction type id, terminal number, transaction serial number of the terminal, terminal transaction date and time together, encrypting the linked data with the XOR operation result and taking the first four bytes of the encrypted data as TAC code.

Step 214, return a message in response to the instruction DEBIT FOR PURCHASE to the terminal and end the transaction.

The message in response to the instruction DEBIT FOR PURCHASE is comprised of data+sw1+sw2. In case of a successful execution of the instruction DEBIT FOR PURCHASE, both the status codes sw1 and sw2 in the response message are 9000 and data in Data field are TAC and MAC4, or in case of a failed execution, the status codes sw1 and sw2 are not 9000 and there is not a Data field.

The message in response to the instruction DEBIT FOR PURCHASE is 01 0D B1 09 00 02 EA B1 90 00.

The embodiment discloses a method for complex-loading of the e-purse inside a CPU card, which makes the complex-loading safer and prevents the complex application specific file in the CPU card from being modified invalidly. Also, the method simplifies the tier discount operation by writing new data to the complex application specific file, this is that a new discount rate based on a recharging amount is set during a recharging process, and it makes management easier. The discount a member has been given only relates to his or her recharging amount, and more recharging amount means more discounts, and therefore it reduced cost on management.

Embodiment 2

Figure 4:
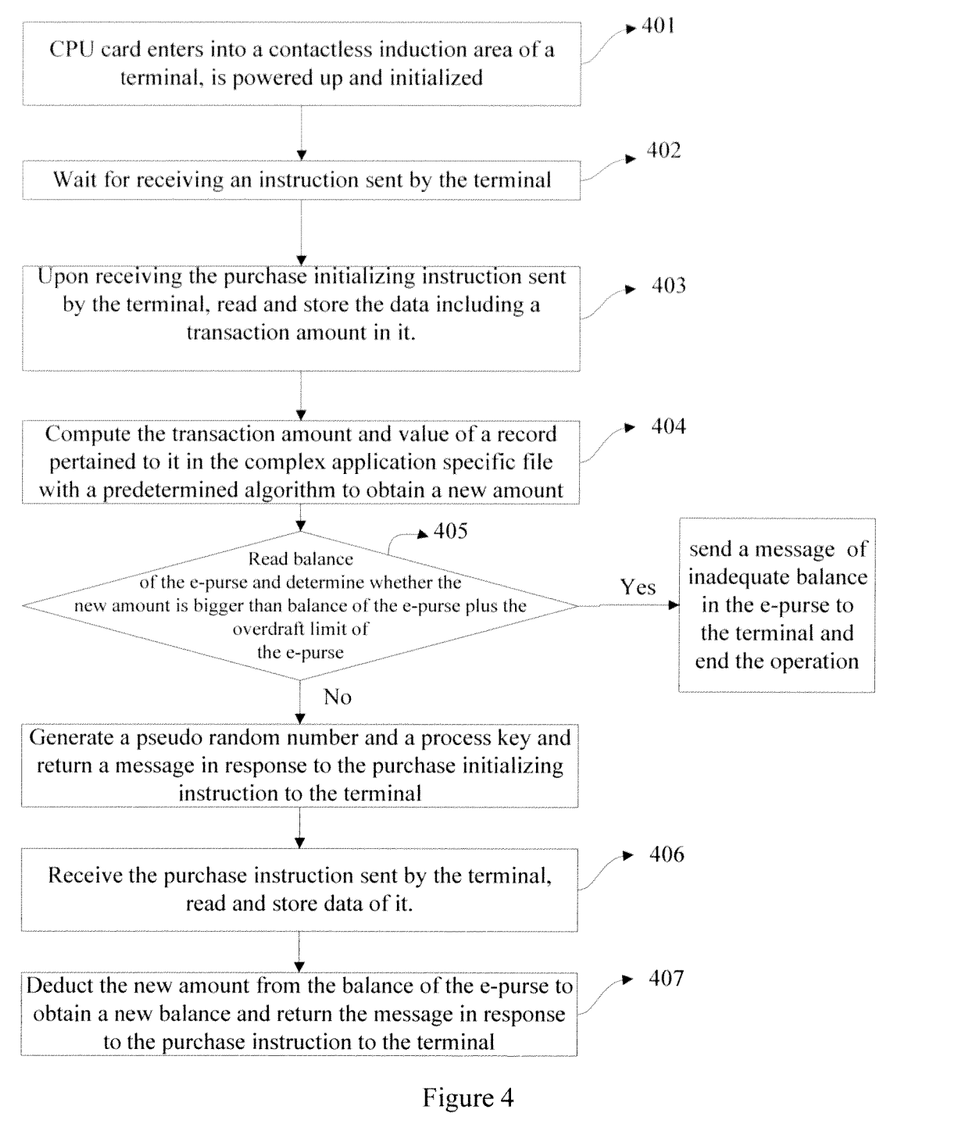
FIG. 4 is a flow chart of a method for purchase with an e-purse provided in Embodiment 2.

For simplifying the tier discount operation and automatically processing purchase amount, the embodiment of the invention discloses a method for purchase with an e-purse, as shown in FIG. 4, including steps as follows.

Step 401, a CPU card enters into a contactless induction area of a terminal, is powered up and initialized.

Step 402, the CPU card waits for receiving an instruction sent by the terminal.

Step 403, in case of receiving a purchase initializing instruction sent by the terminal, the CPU card reads and stores data thereof.

The data includes a transaction amount.

Step 404, the CPU card computes transaction amount and value in a related record in the complex application specific file with predetermined algorithm to obtain a new amount.

Step 405, the CPU card reads balance of the e-purse and determines whether the new amount is bigger than the balance plus overdraft limit of the e-purse, if yes, sends a message of inadequate balance in the e-purse to the terminal and ends the transaction; or if no, generates a pseudo random number and a process key and returns a message in response to the purchase initializing instruction to the terminal.

Step 406, receive a purchase instruction sent by the terminal, read and store data thereof.

Step 407, deduct the new amount from balance of the e-purse to obtain a new balance and return a message in response to the purchase instruction to the terminal.

The following is detailed description of Embodiment 2 provided in the invention.

Embodiment 3

The embodiment of the invention discloses a method for purchase with an e-purse. Besides all transaction functions provided by a complex application e-purse, the e-purse inside the CPU card further supports complex-loading and purchase. Complex-loading of the e-purse inside the CPU card is executed at the CPU terminal. For example the complex-loading is executed by adding transaction amount to balance of the e-purse and then in case of purchase, computing the transaction amount and value in a related record of the complex application specific file according to predetermined algorithm to obtain a new amount and deducting the new amount from balance of the e-purse to obtain a new balance.

Figure 5:
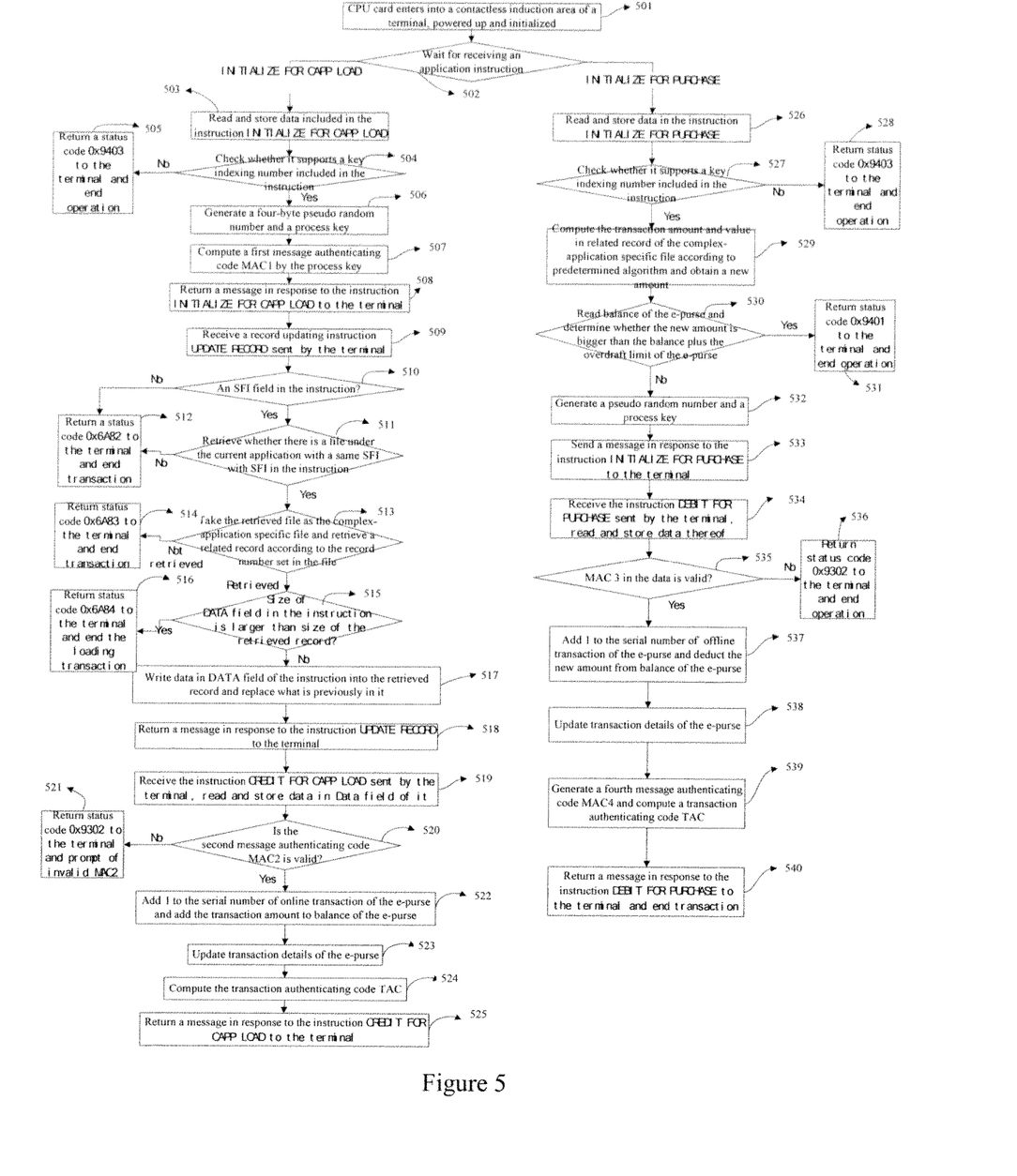
FIG. 5 is a detailed flow chart of a method for purchase with an e-purse provided in Embodiment 2.

As shown in FIG. 5, a method for purchase with an e-purse is implemented by following steps.

Step 501, the CPU card enters into a contactless induction area of a terminal, is powered up and initialized.

Step 502, the CPU card waits for receiving an instruction sent by the terminal, and Step 503 is executed in case of receiving a complex-loading initializing instruction INITIALIZE FOR CAPP LOAD or Step 526 is done in case of receiving a purchase initializing instruction.

Step 503, read and store data in the complex-loading initializing instruction INITIALIZE FOR CAPP LOAD.

The complex-loading initializing instruction INITIALIZE FOR CAPP LOAD is used for initializing the complex loading, and message of the instruction is comprised of an instruction header and an instruction body, (CLA+INS+P1+P2)+(Lc+Data+Le). CLA+INS+P1+P2 are instruction header, specifically codes of the instruction, of which CLA is type of the instruction, INS are codes of the instruction, P1 and P2 are parameters of the instruction. Lc+Data+Le is the instruction body, of which Lc represents size of data in. Data of the instruction body, Data represents the data in the instruction INITIALIZE FOR CAPP LOAD and Le represents the number of maximum bytes of Data field of expected APDU.

Data in Data field of the instruction INITIALIZE FOR CAPP LOAD includes a key indexing number, a transaction amount and a terminal number.

Specifically, the received instruction INITIALIZE FOR CAPP LOAD is 80 50 06 02 0B 02 00 00 03 E8 00 00 00 00 00 01 10, of which 80 refers to CLA, 50 to INS, 06 to P1, which is defined as a complex-loading initializing flag, 02 to P2, which is defined as an e-purse id, 0B to Lc, 02 to the key indexing number of Data field, 00 00 03 E8 to the transaction amount in Data field, 00 00 00 00 00 01 to the terminal number in Data field and 10 to Le.

Step 504, check whether the CPU card supports the key indexing number included in the instruction INITIALIZE FOR CAPP LOAD, if no, Step 505 is executed; or if yes, Step 506 is done.

Step 505, send a status code 0x9403 to the terminal and end the complex loading initializing operation.

Step 506, generate a four-byte pseudo random number and a process key.

The method for generating the process key includes steps of linking the pseudo random number, the serial number of online transaction of the e-purse and 8000 together, encrypting the linked data with a loading sub-key DLK and taking the encrypted data as the process key.

Step 507, compute the process key to obtain a first message authenticating code MAC1.

The computing the process key to obtain a first message authenticating code MAC1 includes steps of linking balance of the e-purse before the transaction, transaction amount, transaction type id of the e-purse and the terminal number together, encrypting the linked data with the process key and taking the first four bytes of the encrypted data as the first message authenticating code MAC1.

Step 508, return a message in response to the instruction INITIALIZE FOR CAPP LOAD to the terminal.

The message in response to the instruction INITIALIZE FOR CAPP LOAD is comprised of Data+sw1+sw2. In case of a successful execution of the instruction INITIALIZE FOR CAPP LOAD, both the status codes sw1 and sw2 in the response message are 9000 and thus data in Data field of the response message includes balance of CPU e-purse before the transaction, serial number of online transaction of CPU e-purse, version number of the key, algorithm ID, pseudo random number and MAC1; or in case of a failed execution, both the status codes sw1 and sw2 in the response message are not 9000 and there is not a DATA field.

Specifically in the embodiment, the message in response to the instruction INITIALIZE FOR CAPP LOAD is 00 00 00 00 00 01 02 03 01 02 03 04 00 01 B1 0A 90 00.

Step 509, receive a record updating instruction UPDATE RECORD sent by the terminal.

The record updating instruction UPDATE RECORD is used for updating data in a related record of the complex application specific file.

The complex application specific file is comprised of a file header and a file body. The file header includes a two-byte of FILE_ID, one-byte of FILE TYPE, two-byte of FILE SIZE, one-byte of AC1, one-byte of AC2 and two-byte of RFU, FILE TYPE 00 indicates a binary file. FILE TYPE 01 indicates a fix-sized record file, 02 indicates a changeable-sized record file, 03 indicates a recycle file and 05 indicates a key file.

Correspondingly, File Size for a binary file represents size of the file, File Size for a fix-sized record file refers to number and size of records, File Size for a changeable-sized record the refers to number and maximum size of records, File Size for a recycle file refers to number and size of records, and File Size for a key file to number and size of records. AC1 refers to a file reading privilege and AC2 to a file writing privilege. What is in the file body is data of the complex application specific file.

Specifically, the complex application specific file is a fix-sized record file, and thus FILE TYPE is 01 and FILE SIZE, referring to number and size of records, is 0A 10 and what is in the file body is empty.

Further, message of the instruction UPDATE RECORD is comprised of CLA+INS P1+P2+Lc Data, of which P1 and P2 are used for selecting a file and designating a record from the file as record for the complex application specific file and Lc is a value of 4 bytes plus size of data in Data field. Specifically, the instruction UPDATE RECORD is 80 DC 03 68 08 00 00 80 00, of which 00 refers to CLA, DC to INS, 03 to P1, 04 to P2, 08 to Lc and 00 00 80 00 to Data.

What is in Data field of the instruction UPDATE RECORD is new data to be written into the complex application specific file. Application special for each record of the complex application specific file may be defined by the card distributor, so be data in Data field.

Specifically, data in the self-defined Data field is a rate value herein, such as 80%, and it is written into a record for writing a rate value in the complex application specific file.

In case that the rate value is defined as 80%, data in the instruction UPDATE CAPP DATA CACHE may not be 80%, but 125 or 20%.

Or data in the instruction UPDATE CAPP DATA CACHE may not include a rate value, but generate a rate value by the transaction amount after a determination of the transaction amount included in the complex-loading initializing instruction by the CPU card, and the generated value is written into the complex application specific file.

Or data in the instruction UPDATE CAPP DATA CACHE includes a rate value and a premise thereof. Because the complex application specific file in the embodiment is a fix-sized record file, it is predetermined that each record of the complex application specific file includes a premise-based rate value. For example, in case that a purchase amount is bigger than RMB200 yuan and less than RMB300 yuan, the rate value is minus RMB20 yuan or 90%, which represents a deduction of RMB20 yuan or 10% discount upon reaching spending of RMB200 yuan; or in case that a purchase amount is bigger than RMB500 yuan and less than RMB600 yuan, the rate value is minus RMB100 yuan or 80%, which means a deduction RMB100 yuan or 20% discount upon reaching spending of RMB500 yuan. The premise pertained to each record of the complex application specific file is predetermined by a card distributor, and so is the rate value based on the premise.

Step 510, determine whether there is a short file identifier (SFI) field in the instruction UPDATE RECORD, if yes, Step 511 is executed; or if no, Step 512 is executed.

The determining whether there is a short file identifier (SFI) field in the instruction UPDATE RECORD is determining whether the high 5 bits of P2 in the instruction UPDATE RECORD are 0, if yes, there is an SFI field and the high 5 bits of P2 are value of SFI; or if no, there is not an SFI field.

In the embodiment, P2 of the instruction UPDATE RECORD is 68, it means that high 5 bits of P2 are 01101 and there is an SFI field.

Step 511, check whether there is a file under the current application, with a same SFI as that SFI in the instruction UPDATE RECORD, if no, Step 512 is executed; or if yes, Step 513 is executed.

Step 512, return a status code 0x6A82 to the terminal and end the complex-loading operation.

Step 513, take the file checked at Step 511 as the complex application specific file and retrieve a related record from the complex application specific file, according to a designated record number in the instruction UPDATE RECORD, if the record is not retrieved, Step 514 is executed; or it is retrieved, Step 515 is executed.

Specifically, P1 of the instruction UPDATE RECORD is 03, and thus the record numbering 03 in the complex application specific file is the record to be retrieved.

Step 514, return a status code 0x6A83 to the terminal and end the complex-loading operation.

Step 515, check whether size of Data field in the instruction UPDATE RECORD is larger than size of the record being retrieved at Step 513, if yes, Step 516 is executed; or if no, Step 517 is executed.

In the embodiment, the complex application specific file is a fix-sized record file and FILE SIZE in the complex application specific file refers to number and size of records, and therefore size of records in the complex application specific file is decided by value of FILE SIZE. Specifically, value of Lc of the instruction UPDATE RECORD is 08 and that of FILE SIZE is 0A 10, so size of Data field is not larger than that of the complex application specific file.

Step 516, return a status code 0x6A84 to the terminal and end the complex-loading operation.

Step 517, write data in Data field of the instruction UPDATE RECORD into the retrieved record to replace what is previously in it.

Specifically, the step is writing a rate value of 80% into the record and replacing what is previously in it. Because what is previously in the record is empty, the step is writing 00 00 80 00 in Data field of the instruction UPDATE RECORD, into Record 03 of the complex application specific file directly.

In case of a rate value of 125% in the instruction UPDATE RECORD, data being written into the record of the complex application specific file is 125% or in case of a rate value 20% in the instruction UPDATE RECORD, data being written into the pertained record of the complex application specific file is 20%.

Or data in the instruction UPDATE RECORD may not include a rate value itself, but generate a rate value by the transaction amount according to predetermined algorithm after determination of the transaction amount included in the complex loading initializing instruction by the CPU card, and the generated value is written into the complex application specific file.

For example, in case of a transaction amount of RMB800 yuan in the complex loading initializing instruction, less than a predetermined lower limit, such as RMB2000 yuan, a rate value of 95% or 105% or 5% is generated and written into the pertained record in the complex application specific file; or in case of a transaction amount of RMB5000 yuan in the complex loading initializing instruction, between a predetermined lower limit RMB2000 yuan and an upper limit RMB6000 yuan, a rate value of 80% or 125% or 20% is generated and written into the related record in the complex application specific file; or in case of a transaction amount of RMB8000 yuan in the complex loading initializing instruction, a rate value of 75% or 133% or 25% is generated and written into the designated record in the complex application specific file.

Or in case that each record of the complex application specific file records a rate value based on different premise, the rate value and related premise included in the instruction UPDATE RECORD is written into the pertained record, such as writing a rate value of minus RMB20 yuan or 90% and related premise of a purchase amount of between RMB200 yuan and RMB300 yuan, into the record; or writing a rate value of minus RMB100 yuan or 80% and related premise of a purchase amount of between RMB500 yuan and RMB600 yuan, into the record, and etc.

Step 518, return a message in response to the instruction UPDATE RECORD to the terminal.

The message in response to the instruction UPDATE RECORD is comprised of sw1 and sw2 and there is not a Data field. The response message is 9000 in case of a successful execution of the instruction UPDATE RECORD, or not 9000 in case of a failed execution of it.

Step 519, receive the complex loading instruction CREDIT FOR CAPP LOAD sent by the terminal, read and store data in Data field thereof.

The instruction CREDIT FOR CAPP LOAD is used for complex-loading of a transaction.

The message of the instruction CREDIT FOR CAPP LOAD is comprised of CLA+INS+P1+P2+Lc+Data+Le, of which data in Data field includes a transaction date, transaction time and a second message authenticating code MAC2.

The received instruction CREDIT FOR CAPP LOAD is 80 52 00 00 0B 07 DA 06 08 0A 14 2D 00 01 A1 0B 08, of which 80 refers to CLA, 52 to INS, 00 to P1, 0B to Lc, 07 DA 06 08 to the transaction date, 0A 14 2D to the transaction time, 00 01 A1 0B to MAC2 and 08 to Le.

Step 520, authenticate whether the second message authenticating code MAC2 is valid, if no, Step 521 is executed; or if yes, Step 522 is executed.

The authenticating whether MAC2 is valid includes steps of linking the transaction amount, transaction type id, terminal number, transaction date and time together, encrypting the linked data with the process key generated at Step 506 and comparing the first four bytes of the encrypted data to MAC2 in Data field of the instruction CREDIT FOR CAPP LOAD, if a match is not found, MAC2 is invalid; or if a match is found, MAC2 is valid.

Step 521, return a status code 0x9302 to the terminal and prompt an invalid MAC2. Step 522, add 1 to the serial number of online transaction of the e-purse, and the transaction amount to balance of the e-purse.

In case of a transaction amount of RMB1000 yuan and a balance of RMB0 yuan in the e-purse, the step is adding the transaction amount of RMB1000 yuan to balance of the e-purse to obtain a new balance of RMB1000 yuan.

Step 523, update transaction details of the e-purse, which specifically is linking the serial number of online transaction of the e-purse, transaction amount, transaction type id, terminal number, transaction date and time together to form a record for updating the standard transaction details.

Step 524, compute a transaction authenticating code (TAC).

The computing TAC includes steps of performing XOR operation on the right and left 8 bytes of the internal key DTK, linking balance of the after-transaction e-purse, serial number of online transaction of the e-purse before adding transaction amount, transaction type id, terminal umber, transaction date and time together, and encrypting the linked data with the result of the XOR operation to obtain a data TAC.

Step 525, return a message in response to the instruction CREDIT FOR CAPP LOAD to the terminal.

The message in response to the instruction CREDIT FOR CAPP LOAD is comprised of data+sw1+sw2. In case of a successful execution of the instruction, both the status codes sw1 and sw2 in the returned response message are 9000 and data in Data field of the response message is TAC, or the status codes sw1 and sw2 in the returned response message are not 9000 and there is not a Data field in the response message in case of a failed execution of the instruction.

The message in response to the instruction CREDIT FOR CAPP LOAD is 00 05 D2 BC 90 00.

Step 526, read and store data in a purchase initializing instruction INITIALIZE FOR PURCHASE.

The instruction INITIALIZE FOR PURCHASE is used for initializing a purchase and message of it is comprised of CLA+INS+P1+P2+Lc+Data+Le, of which data in Data field includes a key indexing number, a transaction amount and a terminal number.

The received instruction INITIALIZE FOR PURCHASE is 80 50 01 02 0B 02 00 00 00 C8 00 00 00 00 00 01 0F, of which 80 refers to CLA, 50 to INS, 01 to P1, 02 to P2, which is defined as an e-purse id, 0B to Lc, 02 to the key indexing number, 00 00 00 C8 to the transaction amount, 00 00 00 0 00 01 to the terminal umber and 0F to Le.

Step 527, check whether the CPU card supports the key indexing number included in the instruction INITIALIZE FOR PURCHASE, if no, Step 528 is executed; or if yes, Step 529 is executed.

Step 528, return a status code 0x9403 to the terminal and end the operation.

Step 529, compute the transaction amount included in the instruction INITIALIZE FOR PURCHASE and value in the related record of the complex application specific file according to predetermined algorithm, to obtain a new amount.

The predetermined algorithm includes multiplex, division, addition, subtraction and various combination of the four algorithms.

The value in record of the complex application specific file is a rate value, such as 80%, and in case of a purchase amount of RMB200 yuan, a new amount RMB160 yuan is computed by multiplying the purchase amount RMB200 yuan by the rate value 80% stored in the complex application specific file.

In case of a rate value of 125% being recorded in the complex application specific file, a new amount RMB160 yuan is obtained by dividing the purchase amount RMB200 yuan by the rate value 125% stored in the complex application specific file.

In case of a rate value of 20% being recorded in the complex application specific file, a new amount RMB160 yuan is computed by multiplying the purchase amount RMB200 yuan by the rate value of 20% to obtain RMB40 yuan and deducting RMB40 yuan from the purchase amount RMB200 yuan.

Or in case of a purchase amount RMB550 yuan, the new amount RMB450 yuan is computed by retrieving a rate value, such as minus RMB100 yuan, from a related record based on premise of the transaction amount of between RMB500 yuan and RMB600 yuan and adding the purchase amount RMB550 yuan to the rate value of minus RMB100 yuan.

Step 530, read balance of the e-purse and determine whether the new amount is bigger than the balance plus overdraft limit of the e-purse, if yes, Step 531 is executed; or if no, Step 532 is executed.

Step 531, return a status code 0x9401 to the terminal and end the operation.

Step 532, generate a pseudo random number and a process key.

The process key is used for purchase with a CPU e-purse or M1 e-purse, which is obtained by permission of DPK.

Step 533, send a message in response to the instruction INITIALIZE FOR PURCHASE to the terminal.

The response message is comprised of Data+sw1+sw2, and in case of a successful execution of the instruction, both the status codes sw1 and sw2 in the response message being returned to the terminal are 9000 and data in Data field of the response message includes a balance of e-purse, a serial number of offline transaction of CPU e-purse, an overdraft limit of CPU e-purse, a version number of the key, algorithm id and a pseudo random number; or in case of a failed execution, the response message being returned to the terminal includes only sw1 and sw2 and both of them are not 9000.

The message in response to the instruction INITIALIZE FOR PURCHASE being returned to the terminal is 00 00 4B 00 00 01 00 00 64 02 03 01 02 03 04 90 00.

Step 534, receive the purchase instruction DEBIT FOR PURCHASE sent by the terminal, read and store data in the instruction The instruction DEBIT FOR PURCHASE is used for purchase.

The message of the instruction DEBIT FOR PURCHASE is also comprised of CLA+INS+P1+P2+Lc+Data+Le, and data in Data field includes a terminal transaction serial number, transaction date, transaction time and a third message authenticating code MAC3.

The received instruction DEBIT FOR PURCHASE is 80 54 01 00 0F 00 00 00 01 7D A0 06 09 0F 27 13 01 0A D1 0C 08, of which 80 refers to CLA, 54 to INS, 01 to P1, 00 to P2, 0F to Lc, 00 00 00 01 to the terminal transaction serial number, 7D A0 06 09 to the transaction date, 0F 27 13 to the transaction time, 010A D1 0C to MAC3 and 08 to Le.

Step 535, authenticate whether MAC3 included in the instruction DEBIT FOR PURCHASE is valid by the process key generated at Step 532, if no, Step 536 is executed; or if yes, Step 537 is executed.

The authenticating whether MAC3 included in the instruction DEBIT FOR PURCHASE is valid includes steps of linking the transaction amount, transaction type id, terminal number, transaction date and time together, encrypting the linked data with the process key generated at Step 532 and comparing the first four bytes of the encrypted data to MAC3 included in the instruction DEBIT FOR PURCHASE, if a match is found, MAC3 is valid; or if no, MAC3 is invalid.

Step 536, return a status code 0x9302 to the terminal and end the operation.

Step 537, add 1 to the serial number of offline transaction of the e-purse and deduct the new amount being obtained at Step 529 from the balance of the e-purse.

Step 538, update transaction details of the e-purse.

The transaction details to be updated include the transaction amount, transaction type id, terminal number, transaction date and time. Specifically, the CPU card links the transaction amount, transaction type id, terminal number, transaction date and time together to form a record for updating.

Step 539, generate a fourth message authenticating code MAC4 and compute a transaction authenticating code TAC.

The generating the fourth message authenticating code MAC4 includes steps of encrypting the transaction amount by the process key generated at Step 532 and taking the first four bytes of the encrypted data as the fourth message authenticating code MAC4.

The computing TAC by the result of the XOR operation includes steps of performing XOR operation on the right and left 8 bytes of DTK, linking the transaction amount, transaction type id, terminal number, terminal transaction serial number, transaction date and time together, encrypting the linked data with the result from the XOR operation and taking the first four bytes of the encrypted data as TAC.

Step 540, return a message in response to the instruction DEBIT FOR PURCHASE to the terminal and end the transaction.

The message in response to the instruction DEBIT FOR PURCHASE is comprised of data+sw1+sw2, and in case of a successful execution of the instruction, both the status codes sw1 and sw2 in the response message are 9000 and data in Data field are TAC and MAC4, or in case of a failed execution, the status codes sw1 and sw2 in the response message are not 9000 and there is not a Data field.

The message in response to the instruction DEBIT FOR PURCHASE is 01 0D B1 09 00 02 EA B1 90 00.

For example, the complex application specific file is a binary file, and thus the instruction for updating the complex application specific file, received by the CPU card is not a record updating instruction UPDATE RECORD, but an instruction UPDATE CAPP DATA CACHE, and following the reception of the instruction UPDATE CAPP DATA CACHE, the CPU card starts steps as follows.

Step 509', receive the instruction UPDATE CAPP DATA CACHE for updating the complex application specific file sent by the terminal.

The instruction UPDATE CAPP DATA CACHE for updating the complex application specific file is used for updating data in the complex application specific file.

The message of the instruction UPDATE CAPP DATA CACHE is comprised of CLA+INS+P1+P2+Lc+Data. The instruction UPDATE CAPP DATA CACHE is 80 D6 92 B1 04 00 01 20 00, of which 80 refers to CLA, D6 to INS, 92 to P1, B1 to P2, 04 to Lc and 00 01 20 00 to Data.

Data in Data field of the instruction UPDATE CAPP DATA CACHE is new data to be written into the complex application specific file. Special application of the complex application specific file may be defined by a card distributor and so be the data in Data field. For example, the complex application specific file may be defined as a rate value file, and therefore data in Data field is a rate value, such as 120%.

In case that the complex application specific file is a binary file, FILE TYPE is 00, FILE SIZE refers to size of the file, for example 00 0B, and the file body is empty.

Step 510', determine whether there is an SFI field in the received instruction UPDATE CAPP DATA CACHE, if yes, Step 511' is executed; or if no, Step 512' is executed.

The determining whether there is an SFI field in the instruction UPDATE CAPP DATA CACHE is determining whether the higher 3 bits of P1 in the instruction UPDATE CAPP DATA CACHE are 100, if yes, there is an SFI field and the lower five bits of P1 relates to the SFI field; or if no, there is not an SFI field.

In details, P1 of the instruction UPDATE CAPP DATA CACHE is 92, and thus the high 3 bits of P1 are 100 and there is an SFI field.

Step 511', check whether there is a file under the current application of the CPU card with a same SFI as that SFI in the instruction UPDATE CAPP DATA CACHE, if no, Step 512' is executed; or if yes, Step 513' is executed.

Step 512' return a status code 0x6A82 to the terminal and end the complex-loading transaction.

Step 513', take the file checked at Step 511' as the complex application specific file and check whether size of Data field of the instruction UPDATE CAPP DATA CACHE is larger than size of the complex application specific file, if yes, Step 514' is executed; or if no, Step 515' is executed.

Specifically the complex application specific file is a binary file, and thus size of it refers to value of FILE SIZE, and the determining step is determining whether value of Lc in the instruction UPDATE CAPP DATA CACHE is bigger than value of FILE SIZE in the complex application specific file. Specifically, value of Lc in the instruction UPDATE CAPP DATA CACHE is 04 and value of FILE SIZE is 00 0B, thus size of Data field is not larger than that of the complex application specific file.

Step 514' return a status code 0x6A84 to the terminal and end the complex loading transaction.

Step 515', write data, in Data field of the instruction UPDATE CAPP DATA CACHE, into the complex application specific file and replace what is previously in the complex application specific file.

Specifically, the step is writing a rate value of 120% into the complex application specific file and replace what is previously in it, and for an empty complex application specific file, the step is writing 00 01 20 00, in Data field of UPDATE CAPP DATA CACHE, into the complex application specific file.

Step 516', return a message in response to the instruction UPDATE CAPP DATA CACHE to the terminal.

The message in response to the instruction UPDATE CAPP DATA CACHE is comprised of sw1+sw2 and there is not a Data field, and in case of a successful execution, the response message is 9000, or in case of a failed execution, the response message is not 9000.

The embodiment provides a method for purchase with an e-purse in a CPU card, which makes the complex-loading transaction safer and prevents the complex application specific file in the CPU card from being modified invalidly, and in the meanwhile the method simplifies the tier discount business by writing new data to the complex application specific file, and automatically deals with each spending, which is convenient for management and reduces cost on management.

The aforementioned are just preferred embodiments of the invention, not a limit to protection scope of the invention, and any modification or change easy to be performed by one skilled in the art within scope of the technology solution disclosed by the invention will be protected by the invention and the protection scope of the invention should be based on the claims.

What is claimed is:

1. A method for conducting a financial transaction using a CPU card hosting a micro-processor, an e-purse being in the CPU card, the method being executed by the CPU card micro-processor, the method comprising:

provi­ding the CPU card capable of performing each of a loading initializing instruction and a purchase initializing instruction;

entering a contactless induction area of a terminal by the CPU card;

receiving an operation initializing instruction, which is a first loading initializing instruction sent by the terminal, to the CPU card; reading and storing, by the CPU card micro-processor, data comprising a first transaction amount, in the operation initializing instruction;

in response to receiving the first loading initializing instruction, performing a loading initializing operation by the CPU card micro-processor;

receiving an instruction for updating a application specific file sent by the terminal and retrieving the application specific file by the CPU card micro-processor;

writing data included in the instruction for updating the application specific file, or data generated by the first transaction amount included in the first loading initializing instruction into storage space of the application specific file and replacing what is previously in by the CPU card micro-processor;
receiving a loading instruction sent by the terminal, reading and storing data in the loading instruction by the CPU card micro-processor;
computing the first transaction amount and data in the application specific file according to an algorithm selected from multiplication, division, addition, subtraction and combinations thereof to obtain a new amount and adding the new amount to a balance of the e-purse to obtain a new balance by the CPU card micro-processor; and
receiving an operation initializing instruction, which is the purchase initializing instruction sent by the terminal, to the CPU card; reading and storing, by the CPU card micro-processor, data comprising a second transaction amount in the purchase initializing instruction;
in response to receiving the purchase initializing instruction, computing the second transaction amount and a value in a record of an application specific file according to an algorithm selected from multiplication, division, addition, subtraction and combinations thereof to obtain a new amount by the CPU card micro-processor;
reading a new balance of the e-purse, determining whether the new amount is larger than a balance of the e-purse plus an overdraft limit by the CPU card micro-processor,
 if yes, returning a message of inadequate balance in the e-purse to the terminal and ending an operation by the CPU card micro-processor;
 or if no, generating, by the CPU card-processor, a pseudo random number and a process key, sending a message in response to the purchase initializing instruction to the terminal, receiving a purchase instruction sent by the terminal including a third message authenticating code, reading and storing data in the purchase instruction by the CPU card micro-processor;
authenticating whether the third message authenticating code is valid, using the process key by the CPU card micro-processor,
 if invalid, returning a status code to the terminal and ending the operation by the CPU card,
 if valid, deducting the new amount from the balance of the e-purse to obtain a new amount and returning a message in response to the purchase instruction to the terminal by the CPU card micro-processor;
wherein in response to receiving the purchase initializing instruction at a time of waiting for receiving an instruction sent by the terminal, the method further comprises the steps of:
receiving a second loading initializing instruction sent by the terminal, reading and storing data of the second loading initializing instruction, and performing a loading initializing operation by the CPU card micro-processor;
receiving a record updating instruction sent by the terminal and updating data n a record of the application specific file by the CPU card micro-processor;
wherein the updating data in a record of the application specific file further comprises the steps of;
retrieving the record in the application specific file;
determining whether the size of the data in the record updating instruction is larger than the size of the retrieved record;
 if yes, sending a message, of inadequate storage space for the record to the terminal and ending the operation by the CPU card micro-processor;
 if no, updating data in the retrieved record by the CPU card micro-processor; wherein the retrieving the record in the application specific file comprises the steps of:
determining whether there is a short file identifier in the record updating instruction;
 if no, sending a message of unfound application specific file to the terminal and ending the operation;
 if yes, determining whether there is a file with a same short file identifier as the short file identifier,
 if no, sending a message of unfound application specific file to the terminal and ending the operation;
 if yes, regarding a retrieved file as the application specific file and retrieving a record according to a record number designated in the record updating instruction, from the application specific file,
 if not retrieved, sending a message of unfound related record to the terminal and ending the operation;
 if retrieved, regarding the retrieved record as the record to be updated.

2. The method of claim 1, wherein the data of the operation initializing instruction further comprises a key indexing number and a terminal number.

3. The method of claim 2, wherein in response to receiving the first loading initializing instruction, the loading initializing instruction comprises the steps of:
checking whether the key indexing number is supported by the CPU card micro-processor;
 if no, sending a message of unsupportable key indexing number to the terminal and ending the operation by the CPU card micro-processor;
 if yes, generating a pseudo random number and a process key and computing a first message authenticating code with the process key, and sending a message in response to the first loading initializing instruction to the terminal by the CPU card micro-processor.

4. The method of claim 2, wherein in response to receiving the purchase initializing instruction, before the computing the second transaction amount and value in the related record of the application specific file according to the algorithm, the method further comprises the steps of:
checking whether the key indexing number is supported by the CPU card,
 if no, sending a message of unsupportable key indexing number to the terminal and ending the operation by the CPU card micro-processor;
 or if yes, computing the second transaction amount and value in the related record of the application specific file according to the algorithm by the CPU card micro processor.

5. The method of claim 1, wherein if the operation initializing instruction is a purchase initializing Instruction, data in the purchase initializing instruction comprises a terminal transaction number, transaction date, transaction time and the third message authenticating code.

6. The method of claim 5, wherein if the operation initializing instruction is a purchase initializing instruction, before deducting the new amount from the balance of the e-purse by the CPU card micro-processor, the method further comprises the steps of:
authenticating whether the third message authenticating code is valid by the CPU card, if invalid, sending a message of invalid third message authenticating code to the terminal and ending the operation by the CPU card micro-processor;

if valid, adding 1 to a serial number of an offline transaction of the e-purse and deducting the new amount from the balance of the e-purse by the CPU card micro-processor.

7. The method of claim 1, wherein if the operation initializing instruction is a purchase initializing instruction, after deducting the new amount from the balance of the e-purse to obtain a new balance by the CPU card micro-processor, the method further comprises the steps of:

updating transaction details of the e-purse by the CPU card micro-processor;

and generating message authenticating code and a transaction authenticating code by the CPU card micro-processor.

8. The method of claim 1, Therein if the operation initializing instruction is a purchase initializing instruction, at a time of waiting for receiving an instruction sent by the terminal, the method further comprises the steps of:

receiving a loading instruction sent by the terminal and performing a loading operation by the CPU card micro-processor.

9. The method of claim 1, wherein if the operation initializing instruction is a purchase initializing instruction, the updating data in the retrieved record comprises the steps of:

writing data of the record updating instruction into the retrieved record and replacing what is previously in the retrieved record, or, determining a third transaction amount included in the second loading initializing instruction according to a predetermined rule, generating data according to a determination result, writing the generated data into the retrieved record and replacing what is previously in the retrieved record.

10. The method of claim 1, wherein in response to receiving the first loading initializing instruction, the retrieving the application specific file comprises the steps of:

determining whether there is a short file identifier in the instruction for updating the application file, if no, taking the current file as the application specific file;

if yes, checking whether there is a file under the current application with a same short file identifier as the short file identifier, if no, sending a message of unfound application specific file to the terminal and ending the operation;

if yes, taking the checked file as the application specific file.

11. The method of claim 1, wherein in response to receiving the first loading initializing instruction, before writing the predetermined data into the storage space of the application specific file, the method further comprises the steps of:

determining whether the size of the predetermined data is larger than the size of the storage space of the application specific file, if yes, sending a message of inadequate storage space in the application specific file to the terminal, and ending the operation;

if no, writing the predetermined data into the storage space of the application specific file.

12. The method of claim 1, wherein in response to receiving the first loading initializing instruction, after writing the predetermined data into the storage space of the application specific file and replacing what is previously in the storage space, the method further comprises the steps of:

sending a message in response to the instruction for updating the application specific file to the terminal.

13. The method of claim 1, wherein in response to receiving the first loading initializing instruction, data in the loading instruction comprises transaction date, transaction time and a second message authenticating code;

before computing the first transaction amount and data in the application specific file according to the algorithm, the method further comprises the steps of: authenticating whether the second message authenticating code is valid;

if invalid, returning a message of invalid second message authenticating code to the terminal and ending the operation;

if valid, adding 1 to a serial number of an online transaction of the e-purse and computing the first transaction amount and data in the application specific file according to the algorithm.

14. The method of claim 1, wherein in response to receiving the first loading initializing instruction, after adding the new amount to balance of the e-purse to obtain a new balance, the method further comprises the steps of:

updating transaction details of the e-purse;

computing a transaction authenticating code;

returning a message in response to the loading instruction to the terminal.

15. The method of claim 1, wherein in response to receiving the first loading initializing instruction, the instruction for updating the application specific file is a record updating instruction, and the retrieving the application specific file is retrieving the application specific file and a related record thereof.

16. The method of claim 15, wherein in response to receiving the first loading initializing instruction, the retrieving the application specific file and related record thereof determines whether there is a short file identifier in the record updating instruction, if no, returning a message of unfound application specific file to the terminal and ending the operation;

if yes, checking whether there is a file under the current application with a same short file identifier as the short file identifier, if no, returning a message of unfound application specific file to the terminal and ending the operation;

if yes, taking the checked file, as the application specific file and retrieving a record in the complex application specific file according to the record number designated in the record updating instruction;

if not retrieved, returning a message of unfound record for updating to the ter nal and ending the operation;

if retrieved, taking the retrieved record as the record to be updated.

* * * * *